United States Patent [19]

Andersen et al.

[11] 4,160,808
[45] Jul. 10, 1979

[54] PYROHYDROLYSIS PROCESS FOR SPENT ALUMINUM REDUCTION CELL LININGS

[76] Inventors: John N. Andersen, Moraga; Norman Bell, Livermore, both of Calif.

[21] Appl. No.: 910,416

[22] Filed: May 30, 1978

[51] Int. Cl.² ............................. C01F 7/04; C01B 7/19
[52] U.S. Cl. .................................... 423/119; 423/111; 423/133; 423/484; 423/489; 423/DIG. 16; 423/240
[58] Field of Search ............... 423/119, 484, 111, 489, 423/133; 204/67

[56] References Cited
U.S. PATENT DOCUMENTS 4,113,832   9/1978   Bell et al. ............................. 423/484

Primary Examiner—Herbert T. Carter
Attorney, Agent, or Firm—Paul E. Calrow; Andrew E. Barlay

[57] ABSTRACT

An improved process is provided for the recovery of HF in increased yield from spent aluminum reduction cell linings. The spent linings are pyrohydrolyzed in a fluidized bed reactor and the generated Na-containing vapors and gases are then contacted with a relatively finely divided source of $Al_2O_3$. Contacting is preferably accomplished in the close vicinity of the fluidized bed to obtain extended reaction between the $Al_2O_3$ source and the vapors. This extended reaction allows conversion of the Na-containing compounds, such as NaF and $Na_2O$ to HF and an $Na_2OxAl_2O_3$ compound.

5 Claims, 1 Drawing Figure

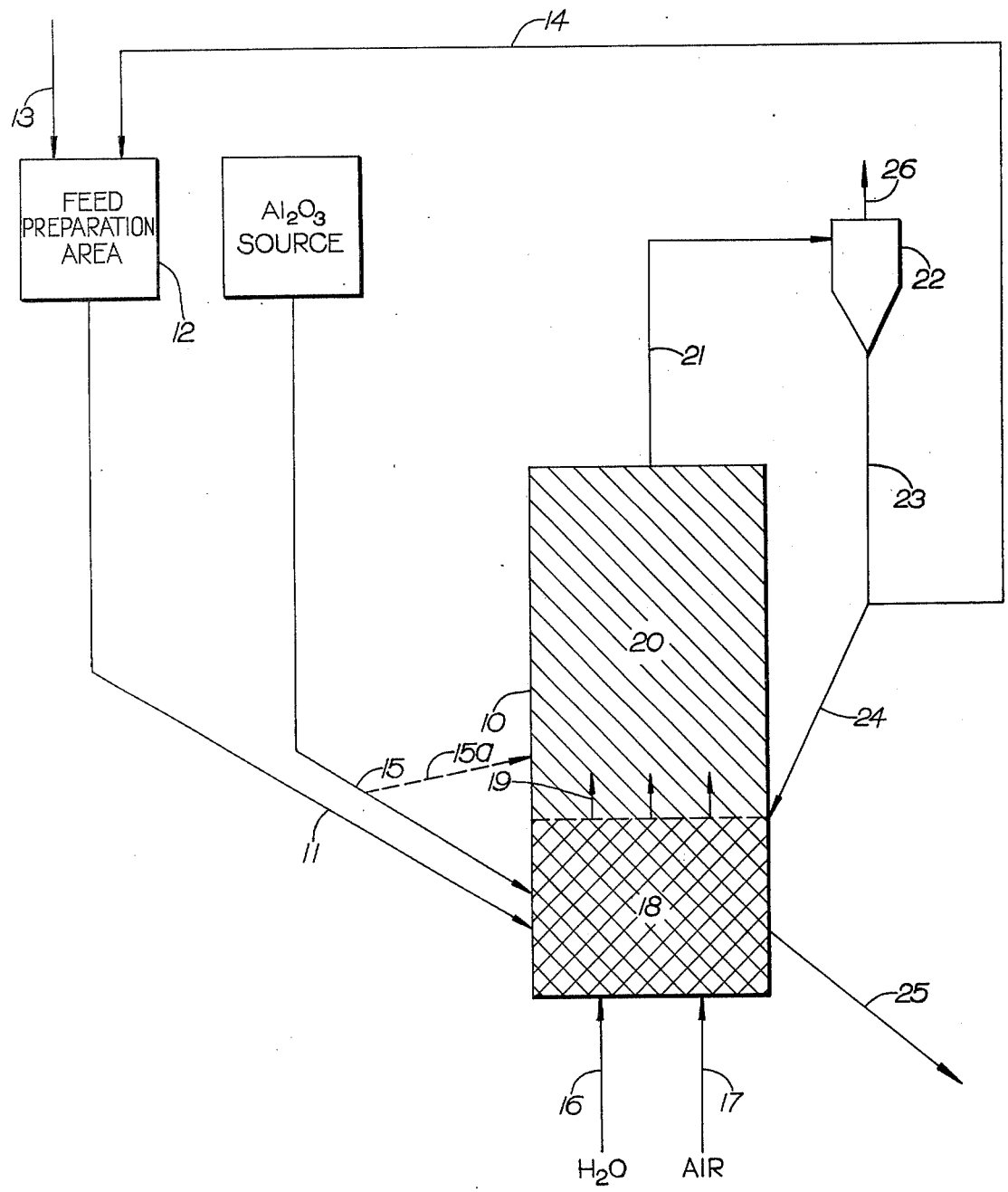

PYROHYDROLYSIS PROCESS FOR SPENT ALUMINUM REDUCTION CELL LININGS

BACKGROUND OF THE INVENTION

This invention relates to the recovery of HF in increased yield from spent aluminum reduction cell linings. More particularly, it concerns an improved pyrohydrolysis method for the recovery of valuable components from spent aluminum reduction cell linings.

It is known that spent aluminum reduction cell linings contain a significant quantity of carbonaceous material, a mixture of fluoridic salts and $Al_2O_3$. Several methods have already been recommended for the recovery of the fluoridic salt and alumina content of this spent material. One of the most efficient methods involves the pyrohydrolysis of the spent cell or pot lining in a fluidized bed reactor. Pyrohydrolysis involves contacting a fluidized bed of spent lining with water or steam and the $H_2O$ introduced reacts with the fluoridic compounds to form HF.

The presence of sodium fluoride and other sodium containing compounds in the pot lining results in the formation of sodium fluoride and sodium oxide vapors. The sodium fluoride vapors are generated from the feed material by the high temperature required in the reactor. The sodium oxide vapors are the initial product of the pyrohydrolysis reactions and the decomposition product of sodium carbonate present in the feed. The sodium oxide vapors react with alumina present in the charge to form an $Na_2O.xAl_2O_3$ compound which remains in the clinker discharged from the bed after completion of the pyrohydrolysis reaction. The constant generation of sodium fluoride and sodium oxide vapors within the fluidized bed and the short gas residence time in the bed results in a reactor offgas which contains a significant quantity of sodium fluoride and sodium oxide vapors. Upon cooling the sodium oxide vapors are converted to sodium fluoride by the HF content of the offgases. Also, upon cooling, the sodium containing vapors may at first liquefy, then the liquid phase NaF may solidify as extremely fine particles. The condensation of the NaF causes the coating of equipment surfaces resulting in pluggages and the finely divided NaF product is difficult to separate in an efficient and economic manner from the gas stream and from the other dusts carried by the gas stream. In many instances, generation of NaF is not desired; often it is preferred that the offgas would contain, besides the gaseous combustion products of the spent lining, essentially only HF without other fluoridic products.

The prior art has already made recommendations for the extension of contact or reaction times in fluidized bed reactors. These recommendations have included the use of multizone reactors, wherein several physically separated stages are maintained. The gases emanating from the first stage bed of the reactor contact during their upward travel one or more additional fluid beds. These systems are particularly useful for the calcination of ores or other materials, such as alumina, but, unfortunately, when applied to the pyrohydrolysis of spent cell linings, they fail to provide the desired results due to the conditions existing in pyrohydrolysis units.

Conducting the pyrohydrolysis in a multistage or multizone reactors, such as referred to above, entails the usual mechanical and operational problems associated with the installation and operation of two or more independent fluid beds. In addition, since there is no generation of heat in the subsequent beds, it will be difficult, if not impossible, to maintain these beds at the same temperature as the initial pyrohydrolysis bed. A drop in temperature of the offgases from the pyrohydrolysis bed will condense sodium fluoride and results in pluggage of the distributor plates of the subsequent fluid beds. A drop in temperature will also adversely affect the capture of sodium oxide by the alumina and result in the recombination of sodium oxide and HF to form additional sodium fluoride. The same applies to fluidized bed systems which employ two side-by-side fluidized beds. In none of these existing systems can the reversion of the generated HF to NaF be avoided.

It has now been found that the conversion of the NaF constituent to HF and the conversion of the Na-containing vapors to $Na_2O.xAl_2O_3$ can be readily and efficiently accomplished by introducing in the fluidized bed reactor a relatively finely divided source of $Al_2O_3$, which will then react with the Na-containing vapors generated by the pyrohydrolysis of spent cell linings in the reactor. Contacting of the Na-containing vapors with the $Al_2O_3$ source is preferably accomplished in the immediate vicinity of the fluidized bed. This assures the extension of the reaction time between the vapors, including the steam and the desired conversion of the NaF constituent of the vapors to HF.

BRIEF DESCRIPTION OF THE FIGURE

The FIGURE schematically shows a fluidized bed reactor wherein a relatively finely divided source of $Al_2O_3$ is introduced in the reactor to provide a secondary or extended reaction zone in the vicinity of the fluidized bed. The source of $Al_2O_3$ is in contact with the generated Na-containing vapors, which are indicated by upwardly pointing arrows.

SUMMARY OF THE INVENTION

In the process of recovering fluoridic values from spent and waste materials generated in electrolytic aluminum reduction systems by employing pyrohydrolysis in a fluidized bed reactor, the yield of HF generated by the pyrohydrolysis reaction can be significantly increased by charging a stream of relatively finely divided source of $Al_2O_3$ into the reactor. The stream of a relatively finely divided $Al_2O_3$ source is introduced either in the fluid bed with the charge of spent and waste materials or in close vicinity of the fluidized bed in order to extend the contact of vaporized Na-containing compounds with the $Al_2O_3$ source and steam. As a result of the extended contact, conversion of NaF to HF is significantly increased and elimination of vapor-phase $Na_2O$, by formation of $Na_2O.xAl_2O_3$ with the finely divided $Al_2O_3$ source is achieved. The improved process allows generation of essentially NaF-free offgases with corresponding increase in HF yield. Also, conversion of NaF to HF avoids scaling and pluggage which is generally associated with the recovery of pyrohydrolysis offgases containing both HF and NaF.

DETAILED DESCRIPTION OF THE INVENTION

This invention relates to the recovery of HF in increased yield from spent aluminum reduction cell linings. More particularly, it concerns an improved pyrohydrolysis process wherein the spent cell linings are contacted in a fluidized bed reactor with water, and the vapors generated by the fluidization and $H_2O$ vapor contact are reacted in the immediate vicinity of the fluidized bed with a relatively finely divided source of $Al_2O_3$ to obtain a "secondary" or "extended" zone of reaction.

For the purposes of this invention, the expressions "spent aluminum reduction cell lining" and "spent potlinings" refer to materials which are recovered from conventional aluminum reduction cells after their useful lives have expired. The composition of typical spent potlinings is shown in Table I.

Table I

| Composition of Typical Spent Potlining | |
|---|---|
| Elements | % by Weight |
| Al | 16.1 |
| F | 10.5 |
| Na | 11.8 |
| Li | 0.3 |
| C | 32.1 |
| Ca | 1.4 |
| Fe | 0.8 |
| Si | 0.7 |
| CN | 0.2 |
| $O_2 + CO_3 + Cl$, etc. | 26.1 |

The term "source of $Al_2O_3$" refers to a material which contains at least about 25% by weight $Al_2O_3$, preferably at least about 35% by weight or more. Typical $Al_2O_3$ sources include bauxite, clay and $Al_2O_3 \cdot xH_2O$, where x can vary from 0.2 to about 3, which designates the fully hydrated alumina, also known as gibbsite or alumina trihydrate.

While the primary charge material is potlining, it is understood that other sources of fluoridic material, such as plant floor sweepings or contaminated electrolytic cell bath, could be added to the feed, such as described in our copending application Ser. No. 855,506 now U.S. Pat. No. 4,113,632.

In the instant process, a charge of spent potlining is subjected to pyrohydrolysis in a conventional fluidized bed reactor. Pyrohydrolysis of spent potlinings, such as having the composition shown in Table I, involves the following main chemical reactions:

$$C + O_2 \rightarrow CO_2 \tag{1}$$

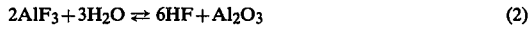
$$2AlF_3 + 3H_2O \rightleftarrows 6HF + Al_2O_3 \tag{2}$$

$$2NaF + H_2O \rightleftarrows 2HF + Na_2O \tag{3}$$

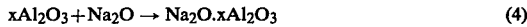
$$xAl_2O_3 + Na_2O \rightarrow Na_2O \cdot xAl_2O_3 \tag{4}$$

It can be readily observed that both reactions (2) and (3) are equilibrium reactions and are reversible under certain conditions. The main goal of pyrohydrolysis of spent reduction cell linings is to obtain as much HF as possible by converting the fluoridic salts to the gaseous HF product.

The pyrohydrolysis of spent potlining should be accomplished at a temperature at which three occurrences take place. The temperature must be high enough to combust essentially all of the carbon content of the potlining to allow reactions (2) and (3) to proceed to the right and to promote reaction (4). It has been found that the temperature required for these steps to take place is at least 1100° C., preferably within the temperature range of about 1150°–1250° C. At this temperature, however, not only the desired reactions take place but also significant vaporization of the Na-containing constituents occurs. Thus, the reaction between the fluoridic salts of the charge and the vaporization of the Na-containing materials are simultaneous occurrences. Due to the high velocity of gas flow required for both fluidization and pyrohydrolysis, the contact between the charge and the water, which can be introduced as liquid, vapor or as a mixture of these, is extremely short and the offgases will carry out not only the formed HF but also the unconverted but vaporized Na-containing compounds. To avoid this occurrence, the instant invention provides a secondary or extended reaction zone, where the contact of these Na-containing compounds with the steam can be prolonged. As a result of this extended reaction zone, the equilibrium reactions designated under (3) and (4) tend to proceed to the right with the ultimate formation of gaseous HF and the solid $Na_2O \cdot xAl_2O_3$ clinker. This is accomplished by introducing into the reactor a sufficient quantity of $Al_2O_3$ source, which, when the above-described reactions are considered, readily accomplishes the desired purpose. The $Na_2O$ formed by reaction (3) will combine with the source of $Al_2O_3$ to form a solid product; this, in effect, removes the $Na_2O$ from the vapor system. At the same time, removal of one of the reaction products of reaction (3) will allow the equilibrium of the reaction to shift to the right with corresponding production of more HF and reduction in the NaF content of the vapors in the reactor.

In order to accomplish the desired reaction between the vaporized $Na_2O$ and the alumina or $Al_2O_3$ source, the alumina source must have a particle size which allows an intimate contact between the vapors and the alumina source. This particle size should be small enough to allow the rapid heat-up of it to the reaction temperature without acting as a heat sink. The particle size of the alumina is fixed relative to the charge material size so that at the velocities required for potlining charge fluidization, the alumina is readily elutriated from or "lifted out" of the reactor fluid bed and carried along by the offgases. The fineness of the alumina particles is limited by the minimum size particle which can be easily separated from the offgas by use of a cyclone. From these considerations, it has been found that the average particle size of the relatively finely divided alumina source is preferably kept within the range of about 40–500 microns, preferably between 200–400 microns, when using a reactor charge size of −4 +8 mesh (a particle size of at least about 2.0 mm). Introduction of the alumina source in the fluid bed reactor is accomplished in a manner so as to provide the "extended" reaction zone contemplated by the instant process in the immediate vicinity of the fluid bed. Due to the relatively small particle size of the alumina source, this can be accomplished at various locations within the fluidized bed reactor. Thus, for example, the alumina source can be charged just above the fluidized bed or to the top of the fluidized bed. It is also possible to introduce the relatively finely divided alumina source directly in the fluidized bed, either separately or with the charge to be fluidized and pyrohydrolyzed. In these instances, due to the high velocity gas flows employed for fluidization and pyrohydrolysis, these particles will be practically "lifted out" of the fluidized bed and will be entrained in the offgases.

The point of addition of the finely divided alumina is to a certain extent determined by the rate of addition and the source of alumina. A key consideration is that the alumina particles entrained by the offgases be at essentially the same temperature as the fluid bed to avoid cooling of the offgases since a drop in temperature would adversely affect both the capture of sodium oxide by the alumina and the conversion of the sodium fluoride vapor to HF. If the alumina feed rate is relatively high and particularly if a hydrated form of alumina is used, the alumina should be added at or close to the fluid bed to assure adequate preheating within the fluid bed.

Since the fluid bed clinker product is generally employed for the recovery of alumina values, for example, by the well-known Bayer process, the solubility of the clinker in caustic solutions should be as high as possible. Under certain process conditions, sodium $\beta$-aluminate may form. This aluminate has a limited solubility in caustic solutions; consequently, generation of it should be kept to a minimum to avoid significant alumina losses. This can be achieved by controlling the alumina content in the feed charge to the fluidized bed reactor. It has been found that production of $Na_2O.11Al_2O_3$ in the clinker can be limited by maintaining an Na:Al mole ratio of not less than about 0.7, preferably in the range of about 0.8–1.0 in the feed to the reactor.

The extended reaction zone of the present invention which is located immediately above the fluid bed consists of finely divided alumina entrained in the offgas stream. This provides (1) additional time for the pyrohydrolysis reactions to proceed, (2) excellent gas to solids contact, (3) a greatly increased alumina surface area for reaction and (4) a two-stage or "extended zone" gas to solids contact area which exposes the offgases to an excess of alumina without increasing the total alumina feed to the system. The concentration of alumina solids carried in the offgases can be controlled by the rate of recycle to the fluid bed of the solids collected by the cyclones connected after the fluidized bed reactor. In order to maintain a high concentration of reactive alumina above the fluid bed, fresh, finely divided alumina source is at least semicontinuously fed to the fluidized bed reactor and a portion of the cyclone underflow is removed and sent to feed preparation for incorporation in the agglomerated charge material. The net result of this procedure is an increase in the concentration of HF in the offgases, which reflects a similar increase in the reactor capacity and the essentially complete elimination of volatile sodium compounds in the offgases. The terms "essentially complete elimination" or "essentially complete conversion" as well as "essentially free of volatile Na-containing compounds" refer to the recovery of an offgas stream from the reactor, wherein of the total fluorine content in the gas, less than about 10, preferably less than 4%, by volume, is contributed by NaF. The reduction of volatile sodium compounds in the offgases eliminates the scaling and pluggage problems existing in prior art systems and also the difficulties associated with the separation of the finely divided sodium fluoride solids from the offgases.

The operation of the pyrohydrolysis unit will be described with reference to the FIGURE. The pyrohydrolysis charge 11, having the desired particle size, is prepared in feed preparation area 12, for example, by blending and agglomerating fluoride-containing waste materials from the electrolytic aluminum reduction system. The feed, as mentioned before, can be either spent potlining or a mixture of potlinings, channel cleanings, floor sweepings and spent alumina scavenger from reduction cell offgas purification systems. The feed also includes relatively finely divided alumina which is introduced into feed preparation area 12 through line 14. This line comes from cyclone 22 which is used to capture finely divided solids, such as entrapped in the offgases emanating from the fluidized bed reactor 10. Fluidized bed reactor 10 is also charged with a fresh source of relatively finely divided $Al_2O_3$ through line 15 or dotted line 15a to establish the desired "extended" reaction zone in reactor 10.

Fluidization and pyrohydrolysis in reactor 10 is achieved by introduction of steam or water (or both) through conduit 16 and the $O_2$-containing gas, such as air, required for the combustion for the carbon present in the charge is introduced through conduit 17. It is to be understood that both the steam and air may be charged to the reactor through a multiple number of jets of well-known design and configuration. Zone 18 represents the fluidized bed in which combustion of the carbon content of the charge takes place and the basic pyrohydrolysis reactions are initiated by contact of water vapor with the fluoridic materials. The upward-pointing arrows 19 indicate the flow of generated gases containing volatile Na-containing compounds and entrained solids mostly from the relatively finely divided $Al_2O_3$ source introduced in the reactor through line 15. Also, if all or a portion of the relatively finely divided solids are introduced through line 15a, contact with the upward-flowing vapors 19 will take place in the immediate vicinity of zone 18. Zone 20 represents the fluidized bed reactor freeboard area where the pyrohydrolysis reaction, due to the introduction of relatively finely divided source of $Al_2O_3$, will proceed essentially to completion as a result of the extended reaction zone. Completion of the pyrohydrolysis reactions results in the formation of HF and a nonvolatile clinker having the general formula of $Na_2O.xAl_2O_3$, where x varies between 1 and 11. This clinker is removed, either continuously or batchwise, from the reactor through discharge line 25. The gaseous reaction products which are essentially free of volatile Na-containing vapors are removed from zone 20 through line 21 and are conducted to a conventional cyclone or dust collector 22. In this cyclone, entrained solids are separated and the dust-free gas is removed through conduit 26 for further processing. The recovered solids from the cyclone are removed through line 23. If desired, a portion of these solids, consisting mainly of relatively finely distributed source of $Al_2O_3$ which has been partially reacted, can be recycled to the reactor through line 24, the remaining portion of the solids can be reintroduced to the feed preparation area 12 through line 14.

The following examples will provide further insight in the operation of the novel pyrohydrolysis process:

EXAMPLE I

For this example, a comparison is made between the operation of a conventional fluidized bed pyrohydrolysis reactor and the novel improved system described hereinbefore.

A conventional single-stage fluidized bed reactor was operated at about 1200° C. The feed charge to the reactor was prepared by blending spent aluminum reduction cell linings and other waste materials from the reduction process, such as floor sweepings, channel cleanings and a source of $Al_2O_3$, for example, bauxite or spent alumina from the reduction cell offgas scrubbing system. The blend was agglomerated, then granulated to provide a feed charge having a particle size range from about 2.0 mm to about 15 mm. The composition of the charge is shown in Table II.

Table II

| Constituent | % by Weight |
| --- | --- |
| Al | 19.8 |
| F | 12.0 |
| Na | 11.2 |
| C | 22.2 |
| $H_2O$ | 9.2 |
| O | 20.3 |
| Misc. Ca, Si, Fe & others | 5.3 |

The mole ratio of Na:Al in the feed was about 0.7. This feed was continuously charged to the reactor at the rate of 6350 kg/hr.

Pyrohydrolysis was instituted by introduction of steam in the reactor and air was also introduced to promote combustion of the carbon content, as well as to maintain fluidizing conditions in the reactor. The offgas generated by the pyrohydrolysis and carbon combustion contained excess water vapor, HF, volatilized NaF, $Na_2O$ vapors in addition to $CO_2$ and $N_2$. The offgases were continuously removed from the reactor and were cooled from about 1200° C. to about 260° C. by direct contact with water sprays. Upon cooling, the $Na_2O$ content of the offgas reacted with the HF present and reverted to NaF, which, together with the original NaF content of the offgas, formed extremely finely divided solid NaF on the equipment surfaces and caused pluggage and scaling, thus reducing the effectiveness of the equipment. From the total fluorine content of the cooled offgas, about 70% by volume was associated with HF, while the remaining 30% with NaF. The finely divided NaF was recovered in a conventional dust separator. This material was contaminated with a quantity of dust carried over by the offgases from the reactor reducing its economic value. The NaF-free offgas was used for recovery of HF and preparation of $AlF_3$, while the clinker removed from the reactor was utilized for $Al_2O_3$ recovery by leaching it with a caustic liquor. In the process, the Na:Al mole ratio was kept at about 0.7 to promote reactions (3) and (4). This, however, resulted in a clinker product containing undesired sodium $\beta$-aluminate and $\alpha$ alumina.

The pyrohydrolysis process described above was then repeated by using the novel "extended" reaction zone concept. The fluidizing and pyrohydrolyzing conditions were kept the same as shown above; however, during the operation of the fluidized bed reactor, a charge of finely divided bauxite of about 57–60% $Al_2O_3$ content on the dry basis was added directly to the fluidized bed. The particle size of this $Al_2O_3$ source was in the range of about 0.10–0.4 mm. This relatively small particle size allowed the ready elutriation or "lifting out" from the bed by the offgas generated by the pyrohydrolysis. The offgas containing the entrained solids was conducted to a cyclone for separation of the solids from the gas.

A portion of the solids collected in the cyclone was recycled to the fluid bed reactor and the remainder of the solids was sent to the feed preparation area. The bauxite feed rate was controlled to a value which, upon recycle of partially spent material to feed preparation, provided a 0.9 Na:Al ratio in the agglomerated reactor charge material.

Due to the extended contact provided between the offgases of the pyrohydrolysis and the relatively finely divided source of $Al_2O_3$ in the "freeboard" or "extended zone" of the fluidized bed reactor, the fluorine content of the offgas was essentially associated with HF. Of the total fluorine content of the gas about 98% by volume was found to be HF and only about 2% by volume of the total F content combined with Na to form NaF. The dust and the small quantity of NaF, which did not cause either pluggage or scaling, were recycled to the feed preparation area and the dust-free HF was employed for the manufacture of $AlF_3$. As a result of the introduction of the relatively finely divided $Al_2O_3$ source in the reactor, the yield of HF was increased by about 40% and the pyrohydrolysis process economy significantly improved due to the virtual absence of scaling. The higher Na:Al mole ratio in the clinker product resulted in a reduction in the $\alpha$ alumina and sodium $\beta$-aluminate contents, thereby increasing the recovery of alumina values by 80%.

EXAMPLE II

The pyrohydrolysis process in accordance with the invention has been repeated by varying the following process conditions:

(a) The relatively finely divided source of $Al_2O_3$ was changed from bauxite to reduction-grade alumina without, however, changing the particle size of the $Al_2O_3$.

(b) The place of introduction of the relatively finely divided source of $Al_2O_3$ was varied by introducing the alumina source to the top of the bed. In a further variation of the process, the charge of finely divided $Al_2O_3$ source was split into two feed streams, one of the streams was charged to the fluid bed, while the other stream was introduced at or about the surface layer of the bed. In the following, the results obtained by these variations is going to be demonstrated.

In case (a), the change of $Al_2O_3$ source from bauxite to reduction-grade alumina was found to be beneficial as far as the heat balance of the pyrohydrolysis process was concerned. Also, with regard to the quantity of $Al_2O_3$ source used for the elimination of the Na-containing compounds from the vapors, less reduction-grade alumina was required.

Since bauxite contains hydrated alumina either in the trihydrate or in the monohydrate form or in a combination of these, the removal of structural $H_2O$ from the trihydrate requires heat energy. The supply of this heat comes from the pyrohydrolysis reactor, thus the bauxite to some extent acts as a heat sink. Reduction-grade $Al_2O_3$ does not have structural $H_2O$; consequently, its use, in lieu of bauxite, eliminates the heat sink associated with the hydrated alumina content of bauxite.

As far as the quantity of relatively finely divided alumina is concerned, bauxite contains up to about 60–64% $Al_2O_3$, while reduction-grade alumina has an $Al_2O_3$ content of up to about 97–98% by weight. This difference in $Al_2O_3$ content allows the use of less alumina in the extended reaction zone, with corresponding reduction in the recycle load from the cyclone. The advantages are necessarily balanced by the cost of reduction-grade alumina versus the significant lower cost of bauxite and clays. From a process point of view, no significant difference in conversion efficiency, i.e., elimination of Na-containing compounds from the vapor, could be observed.

In case (b), the points of introduction have been varied. With the exception of the relative ease by which the source of $Al_2O_3$ can be introduced in the fluid bed itself, charging of the $Al_2O_3$ source above the bed did not change the effectiveness of the process. Thus, whether the $Al_2O_3$ source was charged to the fluid bed or above this bed, or in a split stream, did not materially affect the conversion of the Na-containing compounds of the vapors to HF and $Na_2O \cdot xAl_2O_3$.

What is claimed is:

1. In the process of recovering fluoridic values from spent and waste materials generated in electrolytic aluminum reduction systems by subjecting the materials to pyrohydrolysis in a fluidized bed reactor at a temperature of at least about 1100° C., the reactor having a bed of fluidized spent and waste materials and a freeboard area extending from the surface of the bed to the top of the reactor, the improvement which comprises:

(a) charging a relatively coarse charge of spent and waste materials to the fluidized bed, the charge having a particle size in the range of from about 2.0 mm to about 15.0 mm and a controlled Na to Al mole ratio of not less than about 0.7 and up to about 1.0;

(b) fluidizing and pyrohydrolyzing the coarse charge to generate an offgas containing volatilized fluoridic values including Na-containing vapors;

(c) establishing an extended reaction zone in the freeboard area of the reactor by charging a finely divided source of $Al_2O_3$ to the reactor to contact the offgases and in a manner so as to obtain an excess of Al in the Na:Al mole ratio in the freeboard area whereby essentially all of the Na-containing vapors are converted to HF and $Na_2O \cdot xAl_2O_3$, the relatively finely divided source of $Al_2O_3$ being characterized by an $Al_2O_3$ content of at least about 25% by weight and a particle size in the range of about 40 to about 500 microns and at least a portion of the finely divided source of $Al_2O_3$ being charged to the freeboard area;

(d) recovering an offgas stream from the reactor containing entrained solids, separating the solids from the gas and recycling at least a portion of the solids to the fluidized bed reactor; and (e) recovering a solid clinker from the reactor having a controlled Na to Al mole ratio.

2. Process according to claim 1, wherein the relatively finely divided source of $Al_2O_3$ is selected from the group consisting of bauxite, clay and $Al_2O_3 \cdot xH_2O$, where x can vary between about 0.2 and about 3 and mixtures thereof.

3. Process according to claim 1, wherein the relatively finely divided $Al_2O_3$ source is bauxite and is introduced in the fluidized bed reactor together with the charge.

4. Process according to claim 1, wherein the relatively finely divided $Al_2O_3$ source is reduction-grade alumina having the formula $Al_2O_3 \cdot xH_2O$, where x is less than about 0.3 and wherein this $Al_2O_3$ is introduced in the fluidized bed reactor in a split stream.

5. Process according to claim 1, wherein a portion of the solids recovered from the offgas is recycled directly to the reactor and the remainder of the solids is combined with the relatively coarse charge.

* * * * *

UNITED STATES PATENT AND TRADEMARK OFFICE
CERTIFICATE OF CORRECTION

PATENT NO. : 4,160,808
DATED : July 10, 1979
INVENTOR(S) : John N. Andersen and Norman Bell It is certified that error appears in the above-identified patent and that said Letters Patent are hereby corrected as shown below:

Title Page, under inventors, Assignee, Kaiser Aluminum & Chemical Corporation, omitted from patent document.

Column 3, Line 36, "4,113,632" should be --4,113,832--

Signed and Sealed this

Ninth Day of October 1979

[SEAL]

Attest:

RUTH C. MASON
Attesting Officer

LUTRELLE F. PARKER
Acting Commissioner of Patents and Trademarks